June 21, 1949.　　　　J. F. MELZER　　　　2,474,155
HEATING APPARATUS
Filed June 15, 1945　　　　　　　　　　2 Sheets-Sheet 1
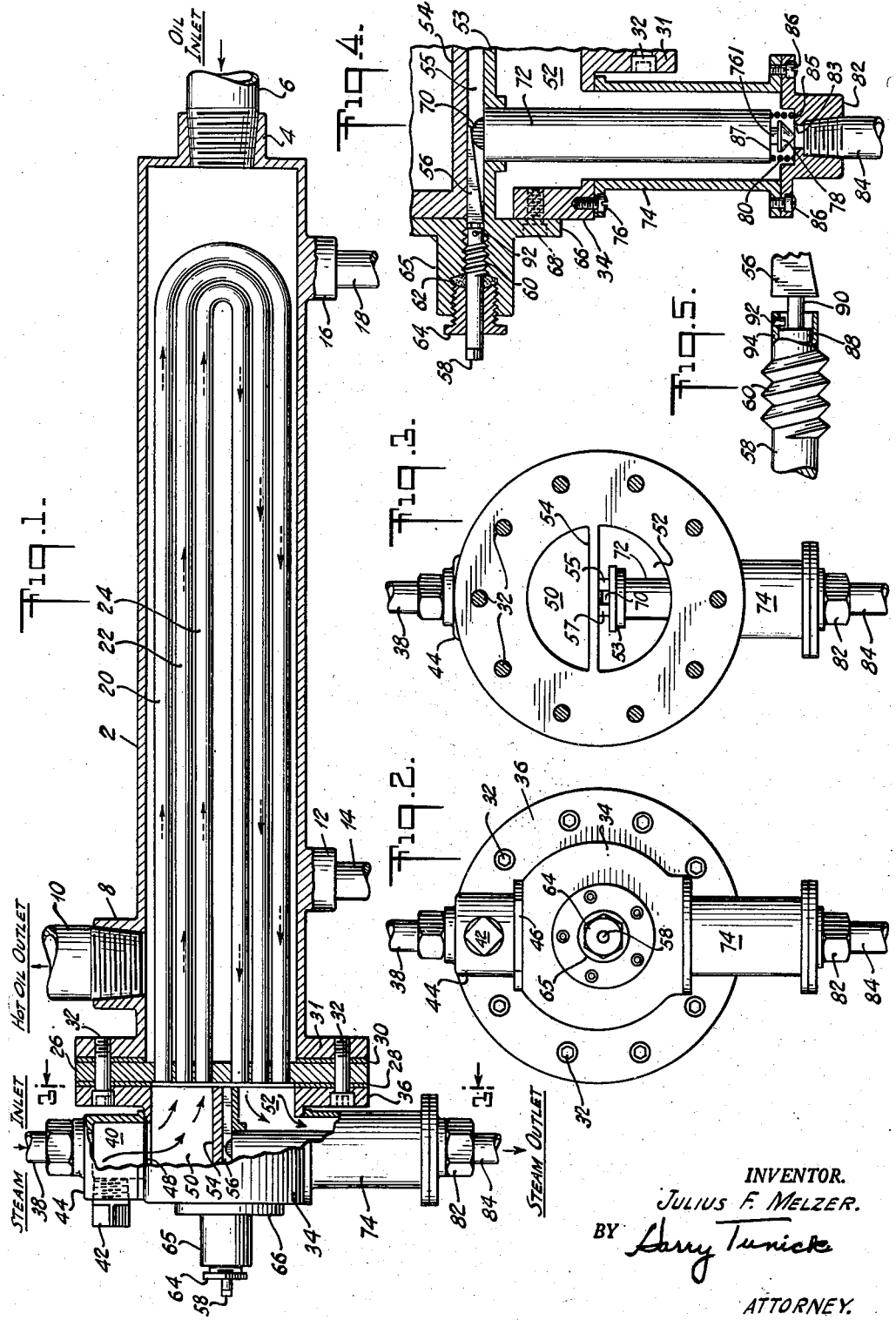
INVENTOR.
JULIUS F. MELZER.
BY Harry Tunick
ATTORNEY.

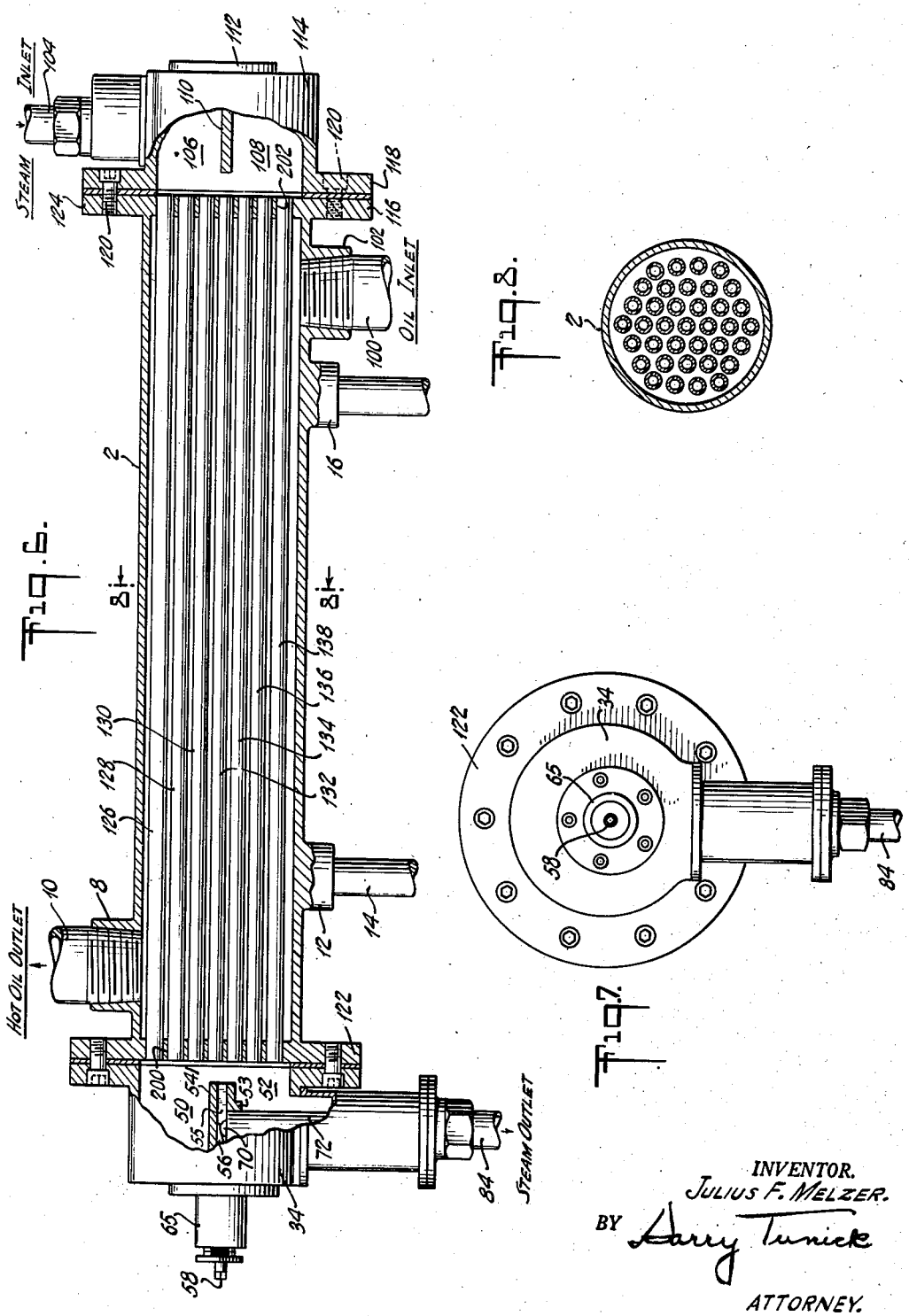

Patented June 21, 1949

2,474,155

UNITED STATES PATENT OFFICE 2,474,155

HEATING APPARATUS

Julius F. Melzer, Port Chester, N. Y.

Application June 15, 1945, Serial No. 599,692

12 Claims. (Cl. 257—2)

My present invention is related to heating and particularly to the indirect heating of one fluid by another, such as the heating of heavy oil by steam.

It has been proposed to heat heavy oil by passing the oil to be heated over a heating coil containing live steam. In one arrangement commonly used heretofore, a thermostat or similar temperature responsive element is mounted in the outgoing or heated oil line. By means of a hydraulic drive or other linkage mechanism the thermostat operates a valve in the incoming live steam line, controlling the flow of steam through the heating tubes in such a way as to maintain the heated oil at a desired temperature. Also in this arrangement of the prior art, piping and valves are provided in order to provide a by-pass around the steam control valve in the event that it becomes inoperative for any reason. In addition, an externally connected trap is provided for the steam exhaust or condensate and this trap is also provided with by-passing pipes and valves to enable the trap to be cut out of the system should it become inoperative.

This arrangement has many disadvantages. Because of the relatively large number of moving parts, failure is relatively frequent; the numerous joints and valves included in the by-passing arrangements are subject to leakage and require constant attention, giving rise to high maintenance costs; the arrangement is costly to install and, when installed, presents an unsightly, complicated appearance; a relatively large amount of space is required for the system, etc. The main purpose and object of my present invention is the simplification and improvement of this type of indirect heating apparatus in such a way as to overcome these objections.

In accordance with my invention, I have devised a unitary or integral header arrangement containing a thermostatically operated valve. The header is so arranged that the exhaust or condensate of the heating medium, which would be water in the case where steam is used for heating purposes, passes over the thermostatically operated valve. The valve operates, as will be described more fully hereinafter, in response to the temperature of the condensate to control the flow of the heating medium through the system so as to maintain desired temperature for the fluid to be heated. Further, I have provided an arrangement whereby the valve may be externally adjusted so as to control the temperature of operation of the system. In addition, my arrangement is such that in the remote event of failure of my improved thermostatically controlled valve, the system can be operated without waiting for repairs to the valve or acquisition of a new valve.

Other objects, advantages and features of my present invention will be apparent as the more detailed description thereof proceeds. The latter will be given with the aid of the accompanying drawings wherein:

Figure 1 is a longitudinal view partly in section of one form of my improved heating system;

Figure 2 is an end view of the system shown in Figure 1;

Figure 3 is a view of my unitary header apparatus used in Figure 1 and is a view looking towards the line 3,3 of Figure 1;

Figure 4 is a cross-sectional view of a part of the integral header apparatus used in Figure 1 and shows the manner in which the thermostatically operated valve contained in the header is adjusted;

Figure 5 is a detailed view of the control rod and wedge mechanism for axially moving the thermostatically controlled valve of Figure 4;

Figure 6 is a longitudinal view partly in section of a modified form of my improved heating system;

Figure 7 is an end view of the left hand header of Figure 6; and

Figure 8 is a cross-sectional view of the heating apparatus of Figure 6 taken on the line 8, 8.

Turning to Figure 1, a metallic cylinder or drum 2 is provided with inlet and outlet couplings 4, 8 into which are screwed the oil inlet pipe 6 and oil outlet pipe 10. By means of gravity operated apparatus or by means of pumping apparatus (not shown) oil to be heated is pumped through pipe 6 into the heating drum 2 and out through the outlet pipe 10.

Within the metal cylinder 2 are a number of heating coils or pipes here shown in the form of hairpin shaped metal tubes 20, 22 and 24. The hairpin or U shaped metal heating tubes 20, 22, 24 are suitably fastened within openings in the circular plate 26 as, for example, by brazing or by being suitably expanded into the openings in the metal disc 26. The plate 26 carrying the hairpin tubes is bolted in position by means of bolts 32 between the flange 36 on the header apparatus, which will be described later, and the flange 31 integral with the cylinder 2. Gaskets 28 and 30 are provided to prevent leakage.

The header having the flange 36 is also provided with a cup-shaped portion 34 divided into two compartments 50 and 52 by means of the baffle 54, as shown more clearly in Figure 3. The construction is such, as will be evident to those skilled in the art, that flow communication between compartments 50 and 52 can only be established by way of the hairpin heating coils 20, 22 and 24.

The heating fluid or steam inlet pipe 38 is in flow communication with space 50 by way of cavity 40 within the cap-shaped enclosure 44. Cap 44 is removably fastened in any suitable way to the cup-shaped header 34 and at their juncture there is provided a disc-like strainer 48. Access to the space 40 and to the strainer 48 for cleaning purposes is provided by means of a plug 42 screwed in to the side wall of cap 44.

As a result of the foregoing construction, steam or heating fluid entering inlet pipe 38 flows into the space or cavity 40, through strainer 48, into compartment 50, and then, by way of the heating coils or hairipn tubes 20, 22, 24, etc. into the cavity, space or compartment 52 below the baffle 54 of the cup-shaped header 34. The heating fluid after losing some of its heat to, or more simply, heating up the medium surrounding the heating coils 20, 22, 24, passes through the metal cylinder 74 and outlet pipe 84. The latter is in flow communication with the interior of cylinder 74 and is fixed in place by coupling 82. As shown in Figure 4, coupling 82 is bolted to the lower flange on cylinder 74 by means of bolts 86 and cylinder 74 is bolted to the cup-shaped header 34 by means of bolts 76.

As shown in Figure 4, it will be noted that there is mounted within cylinder 74 a thermostatically operated valve mechanism 72. The latter may contain a bellows filled with a fluid which expands and contracts with increases and decreases in temperature and these expansions and contractions are transmitted by way of a valve stem 761 to a valve head 78.

It will be observed also that the thermostatically operated valve mechanism is provided with a rounded contact head 79 having flattened sides so as to fit within guides 55 and 57 (see Figure 3). Head 79 is pressed against the wedge 56 by the action of spring 80 surrounding the valve head and thrusting against the shoulder 85 in coupling 82 and the lower base 87 of the valve mechanism 72.

The upper end of the thermostatically operated valve mechanism 72 is slidably held in place by a suitable circular opening in the circular metal head 53 attached to the depending lips 55, 57 which form a keyway or slot along which key 56 may move from left to right or right to left, i. e., horizontally as shown in Figure 4. The guides or lips 55, 57 are cast integral with the gland 65 forming a temperature adjusting subassembly. As shown, the lips or guides 55, 57 carrying head 53 rest against baffle 54, the latter being cast integral with cup-shaped header 34.

By movement of the wedge to the right or left, the entire mechanism 72 is caused to move up or down, thereby enabling initial setting of the valve head 78 with respect to the valve seat 83. In this manner, the temperature of the outgoing heated fluid is controlled or adjusted as desired. The wedge 56 is moved to the right or left by rotating screw threaded rod or shaft 58 having the screw threads 60 engaging cooperating threads in the gland or sub-assembly 65. The latter is provided with a flange 66 which is bolted to the cup-shaped portion 34 of the header by means of bolts 68. Packing 62 and screw threaded stuffing element 64 are provided in order to prevent leakage of steam or any other heating medium along the shaft 58.

The inner end of shaft 58 is undercut as shown in Figure 5 to receive the head 88 attached to stem 90, in turn fixed to the wedge or cam-like element 56. A pin 92 suitably fixed to the shell 94 of the undercut end of rod 58 engages the head 88 to pull the wedge 56 to the left when shaft 58 is turned in such a direction as to move to the left. When the screw threaded rod 58 is caused to move to the right by rotation thereof it butts up against head 88 and causes the wedge 56 to move to the right. This movement of wedge 56 to the right exerts a downward thrust on stop 70, causing mechanism 72 to be moved downwardly against the upward thrust of spring 80, thereby changing the separation between the valve head 78 and the valve seat 83.

By virtue of the foregoing construction, the condensate or the exhaust heating medium controls the flow of the heating medium through the heating coils. Thus, when the condensate is relatively cold, valve head 78 will be relatively far removed from the valve seat 83, permitting a large flow of steam through the system. As the oil heats up the condensate becomes hotter or has a higher temperature, as a result of which the conical valve head 78 moves towards the seat 83, cutting down the amount of heating steam flowing through the heating coils. In this way, the temperature of the outgoing oil or other fluid to be heated is maintained substantially at a desired constant temperature. By knowing the quantity of fluid to be heated, a properly chosen thermostat element 72 can be placed in the condensate line to open and close automatically and thereby maintain a proper temperature of the liquid to be heated. Further adjustment, as will be evident from the foregoing description, is obtained by manually adjusting the control rod 58.

In the event that valve mechanism 72 fails for any reason and cannot immediately be repaired or replaced, the valve can be removed by unbolting bolts 86. Removal of coupling 82 will permit withdrawal of valve 72. The heating system can then be operated without automatic temperature control until such time as the valve 72 is repaired or a new one required. Obviously, the reverse process of installing a new valve mechanism 72 is a simple matter.

The entire system may be supported on supports 14, 18 screwed into internally threaded heads 12, 16 shown in Figure 1. Or, if desired, the entire arrangement may be strapped into place or otherwise held in any desired position or location by means of brackets.

In the modification shown in Figures 6, 7 and 8 single pass heating tubes are employed. The heating tubes 126 to 138 inclusive are suitably expanded into the openings in the otherwise closed off ends 200, 202 of the cylinder 2. As shown, live steam is fed into the inlet pipe 104 and enters the header 114. Header 114 is cast from a slight modification of the pattern for header 34. The baffle 119 of header 114 is allowed to remain in place so as to minimize the amount that the pattern for header 114 has to be altered. The sub-assembly for header 114 is omitted and instead a cover plate 112 is provided.

Steam entering the cavities 106, 108 passes to the left through the heating tubes 126 to 138 inclusive and into the space 50, 52 within the left hand header 34. As indicated on the drawings, both headers 34 and 114 are provided with flanges and gaskets and are bolted to corresponding flanges, such as 124 and 122 on the drum 2.

The oil inlet pipe 100 is screwed into socket 102 arranged at the lower right hand side of cylinder or drum 2, whereas the oil outlet pipe 10 and its socket are arranged as shown in connection with Figure 1 at the upper left hand end of the cylinder 2.

The thermostatically operated valve mechanism 72 of Figure 6 is mounted in the left hand header as described in connection with Figure 4 so that further detailed description thereof is deemed unnecessary. It is to be noted, however, that the baffle 541 in the left hand header of Figure 6 terminates short of the end plate 200 so that there is direct fluid communication between the cavities 50 and 52.

Having thus described my invention, what I claim is:

1. Apparatus for use in a heating system comprising a cup-shaped header, a baffle within and extending across said cup-shaped header and dividing the same into two compartments, a sub-assembly having a pair of guides, said sub-assembly being carried by said header so that said guides rest against said baffle to form a keyway, a wedge movably mounted in said keyway, a screw threaded rod carried by and extending through said sub-assembly and movably engaging said wedge, inlet and outlet openings in said header leading to said compartments, a cap-shaped member mounted over one of said openings, said cap-shaped member having an inlet opening leading to the interior of said cap-shaped member, a strainer in said cap-shaped member and extending over the opening in said header covered by said cap-shaped member, a cleanout plug in said cap shaped member enabling access to said strainer, a cylinder fixed to said header and mounted over the other opening therein, a thermostatically operated valve mounted in said cylinder, said thermostatically operated valve having a valve head adapted to cooperate with a valve seat fixed to one end of said cylinder, and a spring thrusting said thermostatically operated valve against said wedge, said thermostatically operated valve being responsive to increase in temperature in such a way that said valve head tends to move toward said valve seat.

2. Apparatus for use in a heating system comprising a header having a cavity therein, a baffle for dividing the cavity into two compartments, openings in said header leading to each of said compartments, a cylinder fixed to said header and aligned with one of said openings, an opening in the end of said cylinder removed from said header, said opening having a valve seat, a thermostatically operated valve mounted in said cylinder, said valve having its valve head adjacent said seat, a spring holding said thermostatically operated valve mechanism against said baffle, and instrumentalities adjustable externally of said header for adjusting the position of said valve head with respect to said valve seat.

3. Apparatus for use in a heating system comprising a cup-shaped header, a baffle within and extending across said cup-shaped header and dividing the same into two compartments, a sub-assembly carried by said header and having a pair of lips resting against said baffle to form a keyway, a wedge movably mounted in said keyway, a screw threaded rod extending through said sub-assembly and movably engaging said wedge, inlet and outlet openings in said header leading to said compartments, a cap-shaped member mounted over one of said openings, said cap-shaped member having an inlet opening leading to the interior of said cap-shaped member, a strainer in said cap-shaped member and extending over the opening in said header covered by said cap-shaped member, a cleanout plug in said cap-shaped member enabling access to said strainer, a cylinder fixed to said header and mounted over the other opening therein, a thermostatically operated valve in said cylinder, said thermostatically operated valve having a valve head adapted to cooperate with a valve seat fixed to one end of said cylinder, and a spring thrusting said thermostatically operated valve through an opening in a head carried by the lips of said sub-assembly against said wedge, said thermostatically operated valve being responsive to increase in temperature in such a way that said valve head tends to move towards said valve seat.

4. Apparatus for use in a heating system comprising a header having a cavity therein, a baffle for dividing the cavity into two compartments, openings in said header leading to each of said compartments, a cylinder fixed to said header and aligned with one of said openings, an opening in the end of said cylinder removed from said header, said opening having a valve seat, a thermostatically operated valve mounted in said cylinder, said valve having its valve head adjacent said seat, a spring holding said thermostatically operated valve mechanism against said baffle, a sub-assembly carried by said header for maintaining said valve centrally located within said cylinder, and instrumentalities carried by said sub-assembly and adjustable externally of said sub-assembly for adjusting the position of said valve head with respect to said valve seat.

5. Apparatus as claimed in claim 4, characterized by the fact that said sub-assembly includes a perforated head fastened to a pair of guides resting against said baffle to form a slot and that said thermostatically operated valve mechanism extends into said perforated head, a wedge in said slot for exerting a thrust against said thermostatically operated valve mechanism, and a screw threaded rod movably engaging said wedge to enable adjustment of said wedge externally of said sub-assembly whereby the position of said valve head with respect to said valve seat may be adjusted.

6. Apparatus for use in a heating system comprising a cup-shaped header, a metal surface within and extending across said cup-shaped header, a sub-assembly carried by said header and having a pair of guides resting against said metal surface to form a guideway, a head carried by said guides, a wedge movably mounted in said guideway, means extending through said sub-assembly and movably engaging said wedge, inlet and outlet openings in said header, a cylinder fixed to said header and mounted over an opening therein, a thermostatically operated valve in said cylinder, said thermostatically operated valve having a valve head adapted to cooperate with a valve seat fixed to one end of said cylinder, and a spring thrusting said thermostatically operated valve through an opening in a head carried by the guides of said sub-assembly against said wedge, said thermostatically operated valve being responsive to increase in temperature in such a way that said valve head tends to move towards said valve seat.

7. Apparatus for use in a heating system comprising a header having a cavity therein, a metal surface within and extending across said cavity, openings in said header leading to opposite sides of said surface, a cylinder fixed to said header and aligned with one of said openings, an opening in the end of said cylinder removed from said header, said opening having a valve seat, a thermostatically operated valve mounted in said cylinder, said valve having its valve head adjacent said seat, a spring thrusting said thermostatically operated valve mechanism towards said surface, a sub-assembly carried by said header for maintaining said valve centrally located within said cylinder, instrumentalities carried by said sub-assembly and adjustable externally of said sub-assembly for adjusting the position of said valve head with respect to said valve seat, a perforated head integral with said sub-assembly, said thermostatically operated valve mechanism extending into said perforated head, and a wedging device between said thermostatically operated valve mechanism and said surface.

8. Apparatus for use in a heating system comprising a cup-shaped header, a baffle within and extending across said cup-shaped header and dividing the same into two compartments, a sub-assembly carried by said header and having guides resting against said baffle to form a guideway, a perforated head carried by said guides, wedging means movably mounted in said guideway, means extending through said sub-assembly and movably engaging said wedging means, inlet and outlet openings in said header leading to said compartments, a cylinder fixed to said header and mounted over an opening therein, a thermostatically operated valve in said cylinder, said thermostatically operated valve having a valve head adapted to cooperate with a valve seat fixed to one end of said cylinder, and a spring thrusting said thermostatically operated valve through the perforated head carried by the guides of said sub-assembly against said wedge, said thermostatically operated valve being responsive to increase in temperature in such a way that said valve head tends to move towards said valve seat.

9. Apparatus for use in a heating system comprising a header having a cavity therein, an abutment within said cavity and fixed to the header, openings in said header leading to said cavity, a cylinder fixed to said header and aligned with one of said openings, an opening in the end of said cylinder removed from said header, said opening having a valve seat, a thermostatically operated valve mounted in said cylinder, said valve having its valve head adjacent said seat, a spring thrusting said thermostatically operated valve mechanism towards said abutment, a sub-assembly carried by said header for maintaining said valve centrally located within said cylinder, said sub-assembly including a perforated head fastened to a pair of guides resting against said abutment to form a guideway through said perforated head, a wedge between said thermostatically operated valve mechanism and said abutment, and means movably engaging said wedge to enable adjustment of said wedge externally of said sub-assembly whereby the position of said valve head with respect to said valve seat may be adjusted.

10. Apparatus for use in a heating system comprising a cup-shaped header, a baffle within and extending across said cup-shaped header and dividing the same into two compartments, a sub-assembly carried by said header and having a pair of lips resting against said baffle to form a keyway, a perforated head member carried by said lips, a wedge movably mounted in said keyway, a rod extending through said sub-assembly and movably engaging said wedge, inlet and outlet openings in said header leading to said compartments, a cylinder fixed to said header and mounted over an opening therein, a thermostatically operated valve in said cylinder, said thermostatically operated valve having a valve head adapted to cooperate with a valve seat fixed to one end of said cylinder, and a spring thrusting said thermostatically operated valve through the perforated head carried by the lips of said sub-assembly against said wedge, said thermostatically operated valve being responsive to increase in temperature in such a way that said valve head tends to move towards said valve seat.

11. Apparatus for use in a heating system comprising a header having a cavity therein, an abutment within and extending across the cavity, openings in said header leading to said cavity, a cylinder fixed to said header and aligned with one of said openings, an opening in the end of said cylinder removed from said header, said opening having a valve seat, a thermostatically operated valve having a valve head mounted in said cylinder, said valve having its valve head adjacent said seat, a spring thrusting said thermostatically operated valve towards said baffle, a sub-assembly carried by said header for maintaining said valve centrally located within said cylinder, said sub-assembly including a perforated head fastened to said abutment, said thermostatically operated valve mechanism extending into said perforated head, a wedging device between one end of said thermostatically operated valve mechanism and said abutment and a rod engaging said wedging device to enable adjustment of said wedging device externally of said sub-assembly whereby the position of said valve head with respect to said valve seat may be adjusted.

12. Apparatus for use in a heating system comprising a cup-shaped header, a baffle within and extending across said cup-shaped header and dividing the same into two compartments, a sub-assembly carried by said header and having guides resting against said baffle to form a guideway, a wedging member movably mounted in said guideway, a rod extending through said sub-assembly and movably engaging said wedging member, inlet and outlet openings in said header leading to said compartments, a cylinder fixed to said header and mounted over one of the openings therein, a thermostatically operated valve in said cylinder, said thermostatically operated valve having a valve head adapted to cooperate with a valve seat fixed to one end of said cylinder, and a spring thrusting said thermostatically operated valve through an opening in a head carried by the guides of said sub-assembly against said wedging member, said thermostatically operated valve being responsive to increase in temperature in such a way that said valve head tends to move towards said valve seat.

JULIUS F. MELZER.

REFERENCES CITED

The following references are of record in the file of this patent:

UNITED STATES PATENTS

| Number | Name | Date |
| --- | --- | --- |
| 850,923 | Gold | Apr. 23, 1907 |
| 1,024,729 | Lawler | Apr. 30, 1912 |
| 1,722,884 | Autrey | July 30, 1929 |
| 1,960,856 | Stacey | May 29, 1934 |
| 2,028,173 | Thomas | Jan. 21, 1936 |
| 2,144,030 | Potter | Jan. 17, 1939 |
| 2,296,325 | Bak | Sept. 22, 1942 |
| 2,307,341 | Van Vulpen | Jan. 5, 1943 |
| 2,421,144 | Donnelly | May 27, 1947 |

FOREIGN PATENTS

| Number | Country | Date |
| --- | --- | --- |
| 452,416 | France | Mar. 6, 1913 |